Sept. 7, 1954     A. M. ROCKWELL     2,688,263

PLANETARY GEARING

Filed July 21, 1951

Inventor
Albert M. Rockwell
by Charles Andersen
Attorney

Patented Sept. 7, 1954

2,688,263

UNITED STATES PATENT OFFICE 2,688,263

PLANETARY GEARING

Albert M. Rockwell, Glastonbury, Conn., assignor to United Aircraft Corporation, East Hartford, Conn., a corporation of Delaware Application July 21, 1951, Serial No. 237,891

11 Claims. (Cl. 74—801)

This invention relates to improvements in gearing and particularly to planetary gearing.

In high speed planetary gearing the pinions travel at an extremely high speed and the surface speed between the pinion and supporting pin is accordingly very high. A feature of this invention is an arrangement for providing for rotation of the supporting pin for the pinion but at a rate different from that of the pinion rotation so that the relative speeds are reduced.

The invention is applicable to other types of gearing and particularly wherever there is a gearing arrangement in which one or more gears on jackshafts mesh with driving and driven gears as, for example, in certain types of reduction gearing. Accordingly, a further feature of the invention is an arrangement for providing for a slow speed rotation of a jackshaft on which a drive transmitting gear is mounted for rotation.

Other objects and advantages will be apparent from the specification and claims, and from the accompanying drawings which illustrate an embodiment of the invention.

Figure 2:
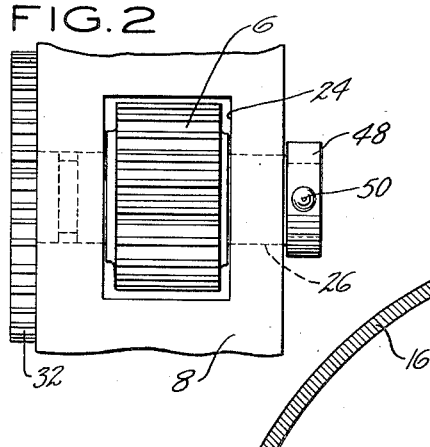
Fig. 2 is a fragmentary developed sectional view substantially along the line 2—2 of Fig. 1 to show the arrangement of the cage.

The invention is shown in a planetary type of reduction gear used particularly in the speed reduction between an aircraft engine and a propeller. As shown, the drive shaft 2 carries a sun gear 4 which meshes with a plurality of pinions 6 carried by a cage 8. The pinions in turn mesh with a ring gear 10 supported within a housing 12. Splines 14 may be used to prevent rotation of the ring gear relative to the housing.

The housing has a cap 16 with a bearing 18 which supports the driven shaft 20 with which the cage may be integral so that the rate of rotation of the pinions 6 about the axis of shafts 2 and 20 will be the rate of rotation of the driven shaft. In the arrangement shown the driven shaft 20 has a pilot bearing 22 located within the drive shaft 2.

The cage is in the form of a ring having openings 24 therein (see Fig. 2) which receive the pinions, the latter being journalled on pins 26. The pins are supported at opposite ends in spaced bearings 28 and 20 provided by the cage, and the pins are rotated within the cage at a speed different from that of the pinions and preferably at a lower rate. To accomplish this, each of the pins 26 has a gear 32 on the end thereof in a position to mesh with a gear 34 in such a position that the movement of the cage will cause turning of the pin within the cage. In the arrangement shown, this gear 34 is carried by the housing 12. With the gear 34 located in fixed relation to the ring gear 10, the pinion supporting pin will rotate within the cage at a speed slower than the rotation of the pinion provided that the gear 32 is larger in diameter than the pinion 6, as shown.

The bearing for the pinion pin may be lubricated by supplying lubricant under pressure to a bore 36 in the driven shaft. Lubricant then flows through radial passages 38 to the bearing 28 and thence through radial passages 40 in the pin 26 to a longitudinal bore 42. Other radial passages 44 and 46 in the pin provide lubricant for the pinion 6 and for the bearing 30, respectively. It will be apparent that the pin is held against longitudinal movement by any suitable means which may be a collar 48 on the end of the pin held in position as by a rivet 50, the latter also holding a cap 52 which closes the end of the bore 42 in the pin.

Figure 1:
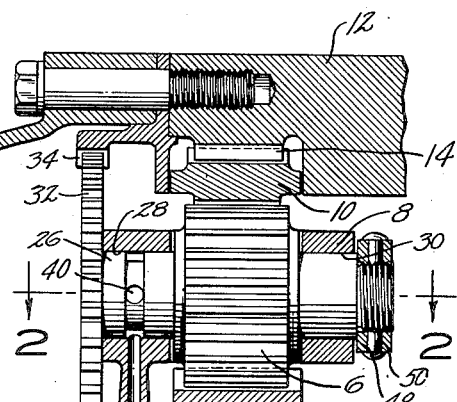
Fig. 1 is a sectional view through a planetary gearing embodying the invention.
Figure 3:
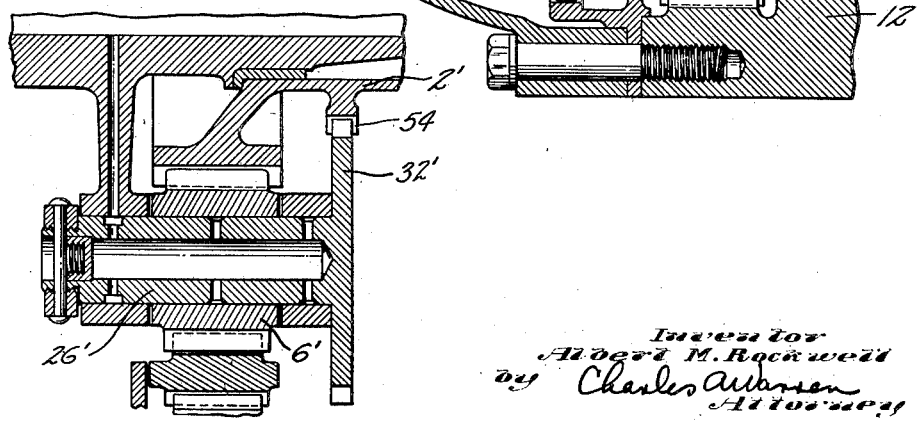
Fig. 3 is a fragmentary sectional view of a modification.

Instead of driving the pinion supporting pins from a fixed gear as in Fig. 1, it will be apparent that the pin 26' may carry a gear 32' in such a position as to mesh with a small diameter gear 54 on the driving shaft 2'. In this arrangement, by proper selection of the dimensions of the pinion 6' and pin gear 32' the rotation of the pin will be considerably smaller than the rate of rotation of the pinion.

It is to be understood that the invention is not limited to the specific embodiment herein illustrated and described, but may be used in other ways without departure from its spirit as defined by the following claims.

I claim:

1. In gearing, coaxial driving and driven shafts, a drive transmitting gearing between said driving and driven shafts including a gear on one of said shafts, a pinion meshing with said gear and by its motion transmitting rotation from one shaft to the other, a pin spaced from the axis of said shafts and on which said pinion is journalled, a supporting structure on which the pin is journalled, and means for rotating said pin within said structure in the same direction as the pinion rotation but at a slower speed.

2. In gearing, coaxial driving and driven shafts, concentric gear elements one of which is connected to one of said shafts, a drive transmitting pinion meshing with said elements, a pin on which said pinion is journalled, a supporting structure connected to the other of said shafts and in which said pin is journalled, and means for rotating said pin within the structure including a gear on said pin and an intermeshing gear connected to one of said concentric gear elements.

3. In gearing, coaxial driving and driven shafts, concentric gear elements one of which is connected to one of said shafts, a drive transmitting pinion meshing with said elements, a pin on which said pinion is journalled, a supporting structure connected to the other of said shafts and in which said pin is journalled, and means for rotating said pin within the structure including a gear on said pin and an intermeshing gear connected to one of said concentric gear elements, the gear on the pin being larger in diameter than the pinion.

4. In gearing, coaxial driving and driven shafts, a drive transmitting gearing between said driving and driven shafts including a gear on one of said shafts, a pinion meshing with said gear and by its motion transmitting rotation from one shaft to the other, a pin spaced from the axis of said shafts and on which said pinion is journalled, a supporting structure on which the pin is journalled, and means for rotating said pin within said structure in the same direction as the pinion rotation but at a slower speed, said last means including a gear fixed to said pin to rotate therewith, and an intermeshing gear on said one of said shafts.

5. In gearing, coaxial driving and driven shafts, a drive transmitting gearing between said driving and driven shafts including a gear on one of said shafts, a pinion meshing with said gear and by its motion transmitting rotation from one shaft to the other, a pin spaced from the axis of said shafts and on which said pinion is journalled, a supporting structure on which the pin is journalled, and means for rotating said pin within said structure in the same direction as the pinion rotation but at a slower speed, said last means including a gear fixed to said pin to rotate therewith, and an intermeshing gear on said one of said shafts, said intermeshing gear smaller in diameter than the first mentioned gear.

6. A planetary reduction gear mechanism including a sun gear, a ring gear concentric thereto, a pinion between and meshing with said sun and ring gears, a cage, a shaft journalled in the cage and on which said pinion is rotatable, and means for rotating said shaft within the cage in response to relative rotation between said gears, said means including a gear secured to said shaft to rotate therewith, and an intermeshing gear connected to one of said sun and ring gears.

7. A planetary reduction gear mechanism including a sun gear, a ring gear concentric thereto, a pinion between and meshing with said sun and ring gears, a cage, a shaft journalled in the cage and on which said pinion is rotatable, and means for rotating said shaft within the cage in response to relative rotation between said gears, said means including a gear secured to said shaft to rotate therewith, and an intermeshing gear connected to said ring gear.

8. A planetary reduction gear mechanism including a sun gear, a ring gear concentric thereto, a pinion between and meshing with said sun and ring gears, a cage, a shaft journalled in the cage and on which said pinion is rotatable, and means for rotating said shaft within the cage in response to relative rotation between said gears, said means including a gear secured to said shaft to rotate therewith, and an intermeshing gear connected to one of said sun and ring gears, the gear secured to said shaft being larger in diameter than the pinion.

9. In a reduction gear, a sun gear, a ring gear, and a planet gear between and meshing with said sun and ring gears, a cage carrying said planet gear, a pin rotatably supported by said cage on which said planet gear is rotatable, a gear fixed on said pin, and a fixed gear concentric to said ring gear and meshing with the gear fixed on the pin to cause rotation of said pin within the cage.

10. In a reduction gear, a sun gear, a ring gear, and a planet gear between and meshing with said sun and ring gears, a cage carrying said planet gear, a pin supported by said cage on which said planet gear is rotatable, a gear fixed on said pin, and a fixed internal gear concentric to said ring gear and meshing with the gear fixed on the pin to cause rotation of said pin within the cage, said fixed gear being larger in diameter than said ring gear.

11. In a reduction gear, a sun gear, a ring gear, and a planet gear between and meshing with said sun and ring gears, a cage carrying said planet gear, a pin rotatably supported by said cage on which said planet gear is rotatable, a gear fixed on said pin, and a gear meshing therewith and rotating with said sun gear to cause rotation of said pin in the cage.

References Cited in the file of this patent

UNITED STATES PATENTS

| Number | Name | Date |
|---|---|---|
| 555,295 | Anderson | Feb. 25, 1896 |
| 1,459,454 | Trotter | June 19, 1923 |
| 2,402,951 | De Pew | July 2, 1946 |
| 2,444,363 | Newcomb | June 29, 1948 |
| 2,498,295 | Peterson et al. | Feb. 21, 1950 |
| 2,500,393 | Williams | Mar. 14, 1950 |